United States Patent [19]

Letter

[11] 4,182,100
[45] Jan. 8, 1980

[54] LAWN MOWER AND EDGER CARRIAGE

[76] Inventor: Joseph D. Letter, 2 Breezeway Dr., Ormond Beach, Fla. 32074

[21] Appl. No.: 901,807

[22] Filed: May 1, 1978

[51] Int. Cl.² .................. A01D 53/00; A01D 67/00
[52] U.S. Cl. .................................. 56/16.7; 56/12.7; 56/16.9; 56/17.1; 172/17
[58] Field of Search .................. 56/16.7, 16.9, 17.1, 56/17.2, 12.7, 256; 172/14, 13, 16, 17, 99

[56] References Cited

U.S. PATENT DOCUMENTS

| | | | |
|---|---|---|---|
| 2,608,043 | 8/1952 | Berdan | 56/17.2 |
| 2,712,212 | 7/1955 | Sears | 56/16.7 |
| 2,721,433 | 10/1955 | Berdan | 56/17.1 |
| 2,942,397 | 6/1960 | Clark | 56/16.9 |
| 3,587,749 | 6/1971 | Savier | 56/256 |
| 3,826,068 | 7/1974 | Ballas et al. | 56/12.7 |
| 3,977,078 | 8/1976 | Pittinger, Jr. | 56/16.9 |
| 4,077,191 | 3/1978 | Pittinger, Sr. | 56/12.7 |

Primary Examiner—Louis G. Mancene
Assistant Examiner—Paul J. Hirsch
Attorney, Agent, or Firm—Brisebois & Kruger

[57] ABSTRACT

A wheeled carrier for a lawn mower and edger which can be of the nylon line type. The mowing and edging tool is yieldably supported on a frame of the carrier to permit multi-directional operator controlled movement of the tool with respect to the carrier by manipulation of handle bars connected to a support for the cutter. The mounting permits steering a front wheel of the carrier by pressure applied to the handle bars. Rear wheels of the carrier are mounted to be fixed in different positions with respect to the front wheel, and parallel to each other to enable moving the carrier in different straight-line directions with respect to its longitudinal axis.

10 Claims, 6 Drawing Figures

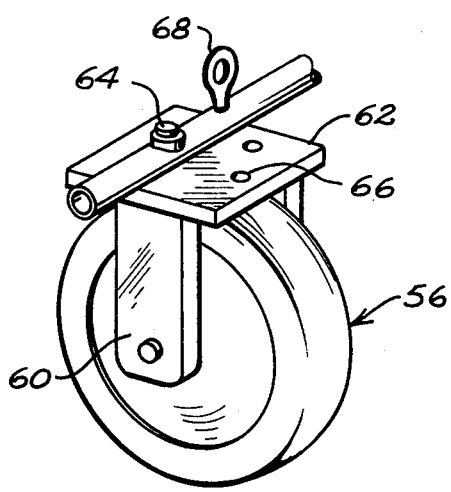
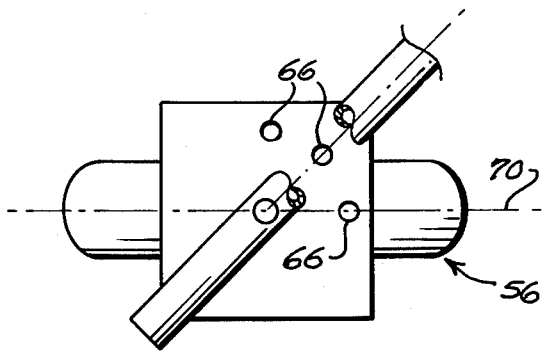
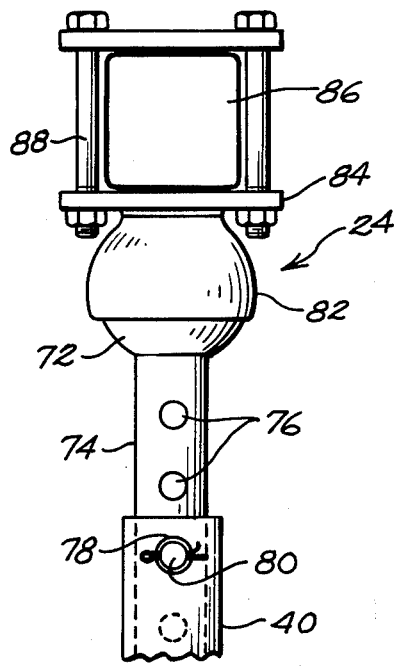
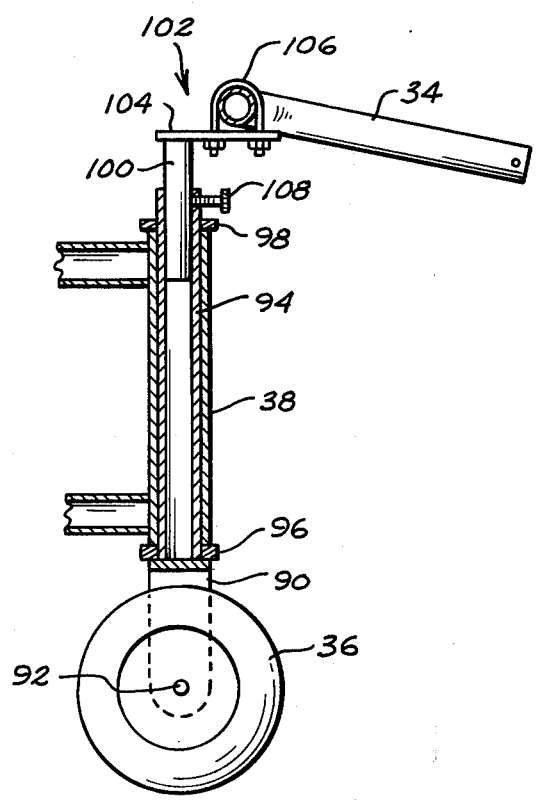

/ 1

LAWN MOWER AND EDGER CARRIAGE

BACKGROUND OF THE INVENTION

This invention relates to a steerable wheeled carrier for using a lawn edger as both a lawn mowing and edging tool. The invention finds particular utility as a carrier for a nylon line type lawn edger, to permit using the edger as a lawn mowing tool, without hampering its edging ability while mounted on the carrier. The carrier simplifies manipulation of the edger and avoids operator fatigue during long periods of use of the edger.

In recent years, flexible line rotary lawn edgers and trimmers have become popular largely because of their increased safety over metal blade-type edgers. One version of such an edger includes a tubular casing containing a flexible shaft driven by a motor at one end of the casing, the shaft driving a cutting head at the other end of the casing. Such a cutter is shown and desribed in U.S. Pat. No. 3,826,068.

Various body connected supports have been used to carry such mower units so that they can be maneuvered during edging. Often a strap is attached near the power source and the unit is supported on the shoulder of the operator. A handle bar is located on the upper end of the tubular casing so the cutting head can be raised or lowered, tilted, or moved laterally in the desired direction. Such arrangements, however, puts the entire weight of the unit on the operator and requires a concentrated effort on his part to keep the head at the proper location and angle. After extended periods of trimming the operator tends to become fatigued frequently resulting in improper orientation of the head. In addition, to momentarily leave the unit, it must be shut down and removed from the user's shoulder.

PRIOR ART

Prior devices for carrying a mower or edger are disclosed in U.S. Pat. Nos. 2,608,043 and 2,721,433. In each of these references a motor is secured below a frame and the angle of inclination of the unit can be changed using a hand knob or crank. The adjustment is quite cumbersome and in each adjusted position the cutter is relatively fixed in relation to the frame. Therefore these prior devices have limited versatility, since the position of the cutter cannot be changed rapidly, as it can be when the cutter is hand held. Hence, prior devices are not wholly satisfactory because they either do not relieve the operator of a major portion of the weight of the unit or do not provide adequate maneuverability to derive full advantage from the cutter, especially where the cutter is of the flexible line type.

The present invention overcomes the disadvantages of the prior art by providing a carrier which supports the total weight of the edger, and does not limit the versatility of the edger, allowing tilting and raising or lowering the cutting head easily without adjustment and without the need for separate controls to accomplish such movement. In addition, the present carrier alleviates problems of mowing or edging along monuments or fences on either side of the carrier. This is accomplished by providing two wheels which can be fixed in different positions parallel to each other so as to position the overhung head of the cutter to an outboard position where it can readily edge or mow along elongated obstructions while the wheels fixed in their parallel positions simplify guiding the carriage and mowing unit.

A distinct advantage of this arrangement is the ability to trim and mow grass in areas containing obstructions, with the same uniformity of cutting height as a normal lawn mower, while maintaining the edging and trimming capability of the edger.

OBJECTS OF THE INVENTION

An object of this invention is to provide a wheeled carrier for lawn edgers which supports all the weight of the edging machine, and permits use of the machine as a lawn mower, without interfering with minipulation of the machine for edging.

Another object is a wheeled carrier which permits the operator of an edger mounted on the carrier to easily maneuver the cutting head in virtually any direction with respect to the carrier without the need for making time consuming adjustments of the edger with respect to the carrier. A further object is a wheeled carrier for lawn edgers of the nylon line type in which at least a portion of such an edger is resiliently mounted on the wheeled carrier so that the edger can be minipulated by the operator with respect to the carrier to permit performing customary edging operations while all the weight of the edger remains on the wheeled carrier.

A further object is a wheeled carrier which permits using the edger as a lawn mower in areas containing obstructions, yet maintains the height of the cutter with respect to the ground essentially constant so that neat mowing of uniform height can be done in such obstructed areas, without conscious assistance from the operator.

A further object is a wheeled carrier in which the carrier is easily steered by the operator, and has a pair of wheels which can be swiveled and locked parallel to each other to direct the carriage along a line offset with respect to its longitudinal axis so that the cutter head of the edger is similarly offset to facilitate edging along elongated obstructions such as fences or monuments.

Another object is a lightweight yet rugged carrier having the advantages of the objects specified above and in which an edger unit mounted on the carrier is balanced by resilient means to permit use of the edger as a mower without impairing its minipulation as an edger.

BRIEF SUMMARY OF THE INVENTION

The above mentioned objects are attained, in accordance with a preferred embodiment of the invention, by providing a wheeled carrier having a front wheel which is swiveled or steerable, a pair of spaced apart rear wheels which can be swiveled and locked in several positions parallel to each other, and a flexible mounting, mounting the edger on the carrier so the weight of the edger is supported on the carrier, but the edger can be manipulated with respect to the carrier by virtue of the flexible mounting.

The preferred form of flexible mounting includes a universal joint type mount which can take the form of a ball and socket, and a resilient support spaced from the univeral joint, and permitting limited movement of the edger by direct grasping of a handle of the edger by the operator.

Other features and advantages of the invention will become apparent with reference to the accompanying drawings.

BRIEF DESCRIPTION OF THE DRAWINGS

FIG. 2 is an enlarged partial view showing the lockable swivel joint connection between a rear support and a rear wheel;

FIG. 3 is a partial view in plan of the swivel connection of FIG. 2;

FIG. 4 is an enlarged partial view looking along line 4—4 of FIG. 1, of the rear support and the swivel joint for supporting the edger unit;

FIG. 5 is an enlarged partial view in section of the front wheel and yoke taken along line 5—5 of FIG. 1.

DETAILED DESCRIPTION OF PREFERRED EMBODIMENT

Figure 1:
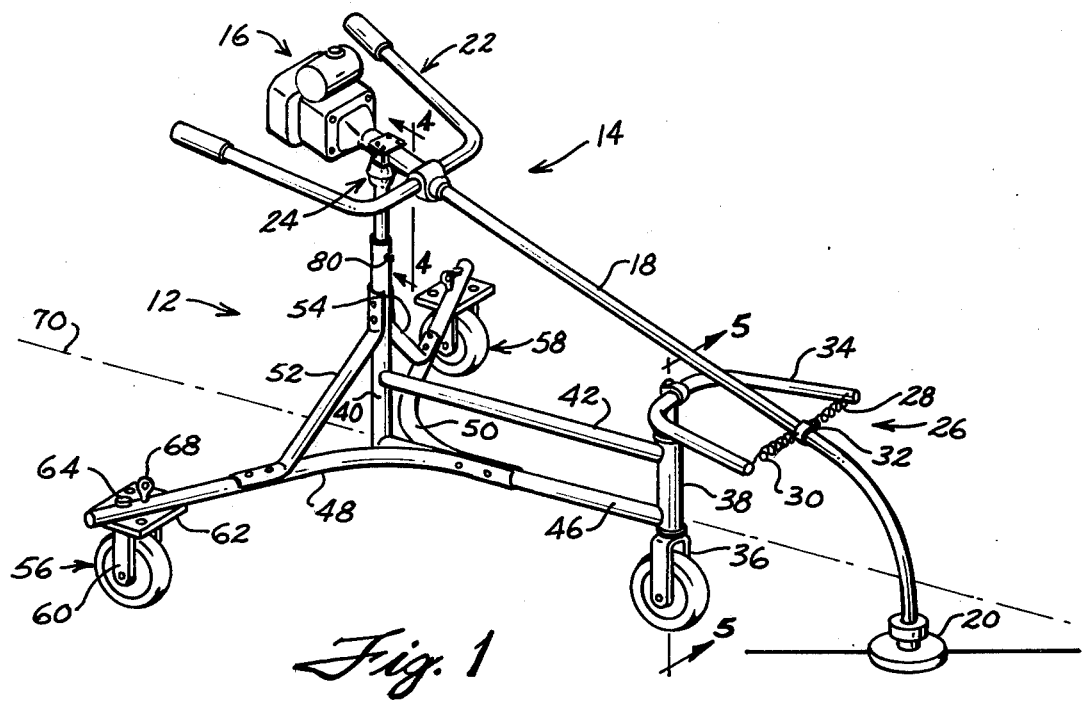
FIG. 1 is a pictorial view of the wheeled carrier of this invention with a lawn edging unit mounted on the carrier.

FIGS. 1 and 4 show a wheeled carrier or carriage 12 in accordance with this invention. Mounted on carriage 12 is a nylon line type lawn edging unit 14. The lawn edging unit typically includes a power head 16 mounted at one end off a hollow column 18 and carries at its other end, a nylon line cutting head 20. Power from motor 16 to cutting head 20 is via a flexible shaft extending through column 18. Connected to column 18 near motor 16 is a handle in the form of handle bars 22 which are secured to the column to permit manipulation of the edging unit by its operator.

Edger unit 14 is supported on carriage 12 by a swivel joint 24, and by a resilient connection 26 which includes helically wound coil springs 28 and 30 having their inner ends connected to column 18 by a clamp ring 32, and having their outer ends connected to a generally U-shaped support yoke 34.

As is evident from FIG. 1, carriage 14 is formed from tubing connected to form the framework of the carriage. Front wheel 36 is mounted to swivel in a vertical front tube 38, and front tube 38 is joined to an upright rear tube 40 by vertically spaced apart tubes 42 and 46 having their ends welded respectively to front tube 38 and rear tube 40. Rear supports 48 and 50 are of tubular construction, and have their inner ends arcuately flattened and bolted to lower horizontal tube 46. Each of the tubes 48 and 50 is bent to extend outwardly in the configuration shown at FIGS. 1 and 5, and tubular braces 52 and 54 are connected between the respective rear supports and rear tube 40. In each instance, the connection can include flattened and curved ends of braces 52 and 54, preferably bolted to the rear supports and vertical tube, to facilitate assembly of the carriage from a disassembled shipping condition.

Rear wheels 56 and 58 are mounted respectively on the outer ends of rear supports 48 and 50. The rear wheels are swivel mounted on the respective supports. As shown at FIG. 2, this mounting includes a swivel plate 62 to which yoke 60 is secured, as by welding, plate 62 being mounted to pivot about the vertical axis of a bolt 64 which pivotally connects the plate and its wheel assembly to the rear support. formed in plate 62 are a plurality of openings 66, each at the same radial distance from the axis of bolt 64, but which are spaced circumferentially in the manner shown at FIG. 3. These openings 66 are positioned to receive a pin 68 inserted vertically through a rear support to lock the wheel at a predetermined angle with respect to the fore and aft center line of carriage 12. This swivel arrangement with its lock pin 68 provides a means for causing the carriage to track in a direction at an angle to its center line 70, in a manner soon to be explained.

FIG. 4 shows the details of swivel 24 and its connection to upright rear tube 40. A ball 72 (which can be a standard trailer hitch ball) is welded to a pipe 74 having vertically spaced apart openings 76 formed therein. Pipe 76 is of a diameter to be received in tube 40. Tube 40 has a bored opening 78 through which a pin 80 can be extended to lock ball 72 at a predetermined height on tube 40, depending on which of openings 76 is aligned with openings 78 when the pin is inserted. As is evident, this arrangement provides a means for adjusting the height of ball 72 vertically.

Mounted on ball 72 is a socket 82 which has a plate 84 secured to its upper end, for example, by welding. A portion 86 of the frame of edging unit 14 seats on plate 84, and the frame portion 86 is clamped to plate 84 and thus, to socket 82 by tie bolts 88. Socket 82 advantageously includes some means for preventing separation of socket 82 from ball 72, such as a retaining ring or inwardly turned skirt (not shown).

FIG. 5 shows one preferred construction for the front wheel and yoke support. As shown at FIG. 5, front wheel 36 is journaled in a yoke 90 by an axle 92, and the yoke is secured, as by welding, to a pipe 94 which extends upwardly through and above the upper end of tube 38. There is a bearing 96 between the yoke and the lower end of tube 38, and a nut 98 is threaded onto the upper end of pipe 94 to hold the assembly together, while permitting pipe 94 to rotate freely within tube 38.

Extending into the upper end of pipe 94 is a bar 100 of a yoke support assembly 102. Yoke support assembly includes a plate 104 secured to the upper end of bar 100, as by welding, and yoke 34 is secured to plate 104 by a pair of U-bolts 106 which clamp the center portion of the tubular yoke to the plate. but which permit swinging the yoke arms to various vertical adjustment positions and locking the yoke in a desired position. The bar 100 of yoke bracket assembly 102 is vertically adjustable in pipe 94 by virtue of a clamping bolt 108 threaded through the wall of pipe 94 at its exposed upper end.

Figure 6:
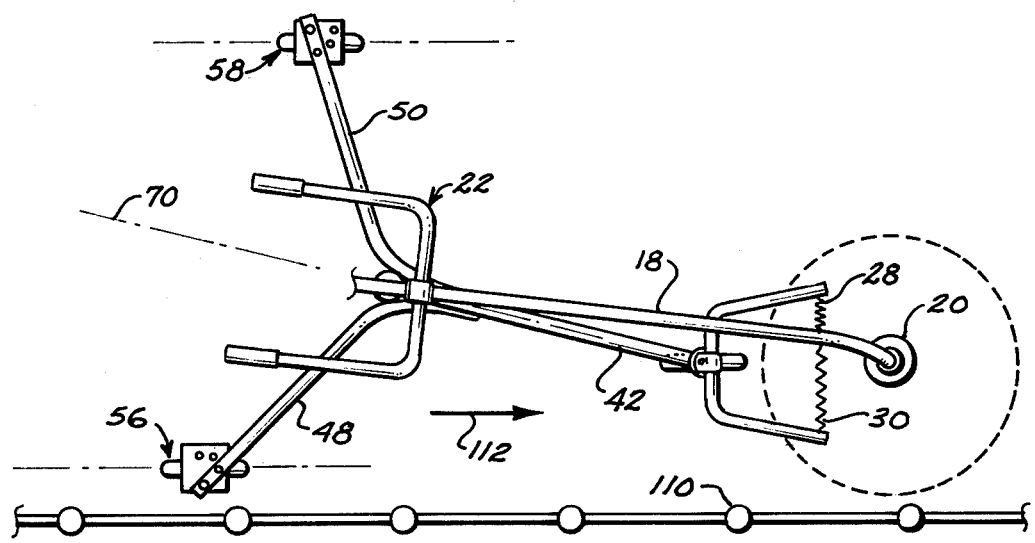
FIG. 6 is a top plan view of the carriage, showing the manner in which the rear wheels can be adjusted and fixed to track at an angle to the longitudinal axis of the carriage.

In normal operation, edger unit 14 is mounted on carriage 12 so that the column 18 of the edger unit lies in a vertical plane including longitudinal axis 70 of the carriage. The vertical height of yoke bracket 102 is adjusted and the vertical inclination of the arms of yoke 34 are adjusted as that the forward end of the edger unit is suspended by springs 28 and 30, and cutter head 20 is at a desired height with respect to the grass or other vegetation to be cut. In this position of the edger unit, column 18 is spaced somewhat above the center portion of yoke 34. Such spacing enables an operator gripping handle bars 22, which are connected to column 18 in front of swivel 24, to move the head 20 downwardly by lifting up on the handle bars, and to move the head upwardly to clear obstructions by pressing down on the handle bars. In addition, turning the handle bars to cause column 18 to rotate, permits swinging the head 20 sideways in an arc so that edging as well as destroying weeds can be done without in any way permanently adjusting the edger unit with respect to the carriage. The carriage with the edger unit mounted thereon is propelled by the operator gripping handle bars 22. By turning the handle bars to exert a force about a vertical axis, head 20 is shifted laterally and yoke 34 turns about the axis of pipe 94 thereby steering front wheel 36 by virtue of the rigid connection between yoke 34 and the front wheel. During normal operation, rear wheels 56 and 58 are locked so that they are parallel to longitudinal axis 70 of the carriage.

Where it is necessary to edge next to an obstruction such as a fence 110, as shown at FIG. 6, pins 68 are removed from the rear wheels and the rear wheels are adjusted and locked by the pin 68, to track at an angle to the longitudinal axis of the carriage. This permits cutter head 20 to trim along the edge of the fence, while causing front wheel 36 to be tracked closely by rear wheel 56, the direction of movement of the carriage being indicated by the arrow 112. While it is preferred to lock both rear wheels so that they are parallel to each other, it has been found that only one rear wheel need be locked, the other rear wheel remaining essentially parallel to the first wheel by virtue of the swivel action of these wheels.

While the embodiment shown and described includes a steerable front wheel, steerable in response to pivoting of yoke 34 as the operator manipulates the edger unit, front wheel 36 can also be a swivel wheel mounted to simply pivot in front tube 36, without direct connection to yoke 34. While such an arrangement has also been found to be satisfactory, greater stability and straight line mowing are attained where the front wheel is steerable.

While preferred embodiments of the mounts 24 and 26 for supporting the edger unit on the carriage have been shown and described, it will be appreciated that other constructions which provide a swivel connection and resiliency to enable the cutter head to be moved laterally, vertically, and swingably with respect to the carriage can certainly be used, without departing from the scope of this invention. For example, the tubing from which the carriage 12 is made can be square tubing rather than the circular tubing shown, and instead of the springs 28 and 30, lengths of shock cord (braided rubber cord with spring characteristics) can be used.

What is claimed is:

1. A wheeled carriage for a grass cutter comprising a frame having ground engaging wheels,
   first means for mounting said grass cutter on said frame for pivotal movement,
   second means spaced from the first means for mounting said cutter on said frame for vertical, horizontal, and tilting movement with respect to said frame,
   one of said mounting means normally maintaining a cutting head of the cutter parallel to the surface traversed by the wheels, and
   handle means secured to said cutter for pivoting the cutter, and moving the cutter vertically, and horizontally, in response to movement of the handle means by the cutter operator.

2. A wheeled carriage according to claim 1 wherein said ground engaging wheels comprises a steerable wheel, and two spaced apart additional wheels, and means mounting each of said additional wheels for adjustment with respect to said frame to a plurality of positions parallel to each other so that said frame can be moved along different straight line paths with respect to an axis of said frame.

3. A wheeled carriage according to claim 1 wherein said first means for mounting said grass cutter on said frame for pivotal movement comprises, a swivel joint.

4. A wheeled carriage according to claim 3 further comprising means for vertically adjusting said swivel joint.

5. A wheeled carriage according to claim 1 wherein said second means comprises resilient means for supporting said cutter for said vertical, horizontal and tilting movement with respect to said frame.

6. A wheeled carriage according to claim 5 wherein said resilient means normally maintains said cutter head parallel with the surface traversed by the wheels.

7. A wheeled carriage according to claim 1 wherein said grass cutter comprises a cutter head connected to a rigid support, and power means on said support for rotating said cutter head, said handle means being secured to said support.

8. A wheeled carriage according to claim 1 wherein said cutting head comprises a flexible line cutter and said mounting means mount said cutter head on said carriage at a position beyond the outline of the wheels of the carriage.

9. A wheeled carriage according to claim 1 wherein said second means comprises, a pair of springs connected between the grass cutter and a spring support of the carriage for normally maintaining said cutting head parallel to the surfaced traversed by the carriage.

10. A wheeled carriage according to claim 9 wherein said spring support comprises a yoke, and means for vertically adjusting said yoke.

* * * * *